United States Patent
Wang et al.

(10) Patent No.: US 11,005,580 B2
(45) Date of Patent: May 11, 2021

(54) ARRAY ANTENNA CALIBRATION METHOD AND DEVICE

(71) Applicant: DATANG MOBILE COMMUNICATIONS EQUIPMENT CO., LTD., Beijing (CN)

(72) Inventors: Shihua Wang, Beijing (CN); Tao Duan, Beijing (CN); Jingyan Ma, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/646,561

(22) PCT Filed: Sep. 4, 2018

(86) PCT No.: PCT/CN2018/104029
§ 371 (c)(1),
(2) Date: Mar. 11, 2020

(87) PCT Pub. No.: WO2019/047831
PCT Pub. Date: Mar. 14, 2019

(65) Prior Publication Data
US 2020/0374015 A1 Nov. 26, 2020

(30) Foreign Application Priority Data
Sep. 11, 2017 (CN) .......................... 201710813631.9

(51) Int. Cl.
*H04B 17/12* (2015.01)
*H01Q 3/26* (2006.01)
*H04B 7/06* (2006.01)

(52) U.S. Cl.
CPC ............. *H04B 17/12* (2015.01); *H01Q 3/267* (2013.01); *H04B 7/0617* (2013.01)

(58) Field of Classification Search
CPC ...... H04B 17/12; H04B 7/0617; H04B 17/11; H04B 17/14; H01Q 3/267
See application file for complete search history.

(56) References Cited

U.S. PATENT DOCUMENTS 6,480,153 B1 * 11/2002 Jung ...................... H01Q 3/267
342/174
8,013,783 B2 9/2011 Lomes et al.
(Continued)

FOREIGN PATENT DOCUMENTS

| CN | 1392692 A | 1/2003 |
|---|---|---|
| CN | 1412965 A | 4/2003 |

(Continued)

*Primary Examiner* — Nguyen T Vo
(74) *Attorney, Agent, or Firm* — Kilpatrick Townsend & Stockton, LLP

(57) ABSTRACT

An array antenna calibration method and device, which is used for calibrating an array antenna in real time in an open calibration environment. The method includes: determining, on the basis of a preset direction angle of each preset beam direction, an initial beam weight vector matrix of an array antenna to be calibrated, and emitting, by a test antenna in a standard beam direction, a first calibration signal to the array antenna to be calibrated; determining, on the basis of the first calibration signal received by each channel of the array antenna to be calibrated, a magnitude-phase error between the first calibration signal received by a center channel and the first calibration signal received by each channel; and using the magnitude-phase error to calibrate the initial beam weight vector matrix, so as to obtain a compensation beam weight vector matrix.

12 Claims, 5 Drawing Sheets

(56) References Cited

U.S. PATENT DOCUMENTS

| | | | | |
|---|---|---|---|---|
| 2006/0111050 A1* | 5/2006 | Choi | ................. | H04B 17/21 |
| | | | | 455/67.11 |
| 2017/0163327 A1* | 6/2017 | Yang | ................. | H04B 7/0413 |
| 2020/0358177 A1* | 11/2020 | Ge | ................. | G01R 29/10 |

FOREIGN PATENT DOCUMENTS

| CN | 101887129 A | 11/2010 |
|---|---|---|
| CN | 103856272 A | 6/2014 |
| CN | 105850062 A | 8/2016 |
| GB | 2431051 A | 4/2007 |
| JP | 2017152872 A | 8/2017 |

* cited by examiner

ARRAY ANTENNA CALIBRATION METHOD AND DEVICE

CROSS REFERENCE

This application is a US National Stage of International Application No. PCT/CN2018/104029, filed on Sep. 4, 2016, which claims the benefit and priority of Chinese Patent Application No. CN201710813631.9, filed with the Chinese Patent Office on Sep. 11, 2017, and entitled "A method and device for calibrating an array antenna". The entire content of the disclosure is incorporated herein by reference.

FIELD

The present disclosure relates to the field of mobile communications, and particularly to a method and device for calibrating an array antenna.

BACKGROUND

In the age of the 5th generation (hereinafter "5G") communication, massive active array antenna technology is a key enabling technology. An active array antenna is a system that receives or transmits electromagnetic waves by directly connecting an active circuit to each element of the array antenna. The active array antenna enables beamforming, and calibrates channels corresponding to each element to ensure the consistence of the amplitudes and phases of the elements, thereby ensuring the effectiveness of the beamforming function.

In the existing technology, over the air (hereinafter "OTA") testing in both the far-field and the near-field in an anechoic chamber is used to calibrate the massive active array antenna to measure the effectiveness of beamforming. However, anechoic chambers are expensive to build and its testing efficiency is low in spite of high accurateness of testing results. Therefore, the testing method mentioned above is only suitable for laboratory studies instead of large-scale mass production.

SUMMARY

Embodiments of the disclosure provide a method and a device for calibrating an array antenna, which calibrate the array antenna in real time in an open calibration environment.

In a first aspect, an embodiment of the disclosure provides a method for calibrating an array antenna. The method includes: transmitting a first calibration signal to an array antenna to be calibrated by using a testing antenna oriented in a standard beam direction, and determining differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; where the central channel is a channel corresponding to a central element of the array antenna to be calibrated; and calibrating an initial beam weight vector matrix according to the differences in both the amplitude and the phase to obtain a compensation beam weight vector matrix, where the initial beam weight vector matrix is determined according to a preset directional angle of each beam direction and each group of initial beam weight vectors corresponds to one of beam directions.

In one embodiment, calibrating the initial beam weight vector matrix according to the differences in both the amplitude and the phase to obtain the compensation beam weight vector matrix includes: compensating for each group of initial beam weight vectors in the initial beam weight vector matrix, respectively, according to the differences in both the amplitude and the phase to obtain the compensation beam weight vector matrix.

In one embodiment, after calibrating the initial beam weight vector matrix according to the differences in both the amplitude and the phase to obtain the compensation beam weight vector matrix, the method further includes: transmitting a second calibration signal at a specified power rating to the array antenna to be calibrated by using the testing antenna oriented in the standard beam direction, and determining a standard beam gain of the second calibration signal transmitted by the testing antenna oriented in the standard beam direction and received by the array antenna to be calibrated via each channel according to the compensation beam weight vector matrix; transmitting the second calibration signal at the specified power rating to the testing antenna oriented in the standard beam direction by using the array antenna to be calibrated, and determining a standard signal power of the second calibration signal transmitted by the array antenna to be calibrated and received by the testing antenna oriented in the standard beam direction; and for each testing antenna oriented in a beam direction different from the standard beam direction: calibrating each channel of the array antenna to be calibrated in a currently selected beam direction by using a currently selected testing antenna according to the standard beam gain and the standard signal power corresponding to the testing antenna oriented in the standard beam direction.

In one embodiment, determining the standard beam gain of the second calibration signal transmitted by the testing antenna oriented in the standard beam direction and received by the array antenna to be calibrated via each channel according to the compensation beam weight vector matrix includes: determining a compensation beam weight vector corresponding to the testing antenna oriented in the standard beam direction according to the compensation beam weight vector matrix; and determining the standard beam gain of the second calibration signal transmitted by the testing antenna oriented in the standard beam direction and received by each channel of the array antenna to be calibrated according to the compensation beam weight vector.

In one embodiment, each channel of the array antenna to be calibrated includes a reception channel and a transmission channel; and after calibrating the initial beam weight vector matrix according to the differences in both the amplitude and the phase to obtain the compensation beam weight vector matrix, the method further includes: updating the initial beam weight vector matrix of each channel of the array antenna to be calibrated according to the compensation beam weight vector matrix, where each updated reception channel of the array antenna to be calibrated corresponds to a compensation reception beam weight vector matrix, and each updated transmission channel corresponds to a compensation transmission beam weight vector matrix, and the compensation reception beam weight vector matrix and the compensation transmission beam weight vector matrix are the compensation beam weight vector matrix, respectively.

In one embodiment, calibrating each channel of the array antenna to be calibrated in a currently selected beam direction by using a currently selected testing antenna according to the standard beam gain and the standard signal power corresponding to the testing antenna oriented in the standard beam direction includes: transmitting a second calibration signal at a specified power rating to the array antenna to be calibrated by using the testing antenna oriented in the currently selected beam direction, and determining a beam gain of the second calibration signal transmitted by the testing antenna and received by the array antenna to be calibrated according to the compensation beam weight vector corresponding to the testing antenna; determining if the difference between the beam gain and the standard beam gain is out of a first preset range; and when the difference between the beam gain and the standard beam gain is determined to be out of the first preset range, adjusting a directional angle of the currently selected beam direction, updating the compensation reception beam weight vector corresponding to an originally selected beam direction according to an adjusted beam direction, and re-calculating the beam gain of the second calibration signal according to an updated compensation reception beam weight vector until the difference between the beam gain and the standard beam gain falls within the first preset range.

In one embodiment, the method further includes: determining that calibration, in the currently selected beam direction, of each reception channel of the array antenna to be calibrated is completed when the difference between the beam gain and the standard beam gain falls within the first preset range, transmitting the second calibration signal at the specified power rating to the testing antenna oriented in the currently selected beam direction by using the array antenna to be calibrated, determining a signal power of the second calibration signal received by the testing antenna and transmitted by the array antenna to be calibrated and determining if a difference between the signal power and the standard signal power is out of a second preset range; and when the difference between the signal power and the standard signal power is determined to be out of the second preset range, re-calibrating each reception channel of the array antenna to be calibrated in the currently selected beam direction; or when the difference between the signal power and the standard signal power is determined to be fall within the second preset range, determining that calibration, in the currently selected beam direction, of each transmission channel of the array antenna to be calibrated is completed.

In one embodiment, before adjusting the directional angle of the currently selected beam direction when the difference between the beam gain and the standard beam gain is determined to be out of the first preset range, the method further includes: determining if a number of calibration, in the currently selected beam direction, of each reception channel of the array antenna to be calibrated is greater than a preset number; and after determining if the number of calibration, in the currently selected the beam direction, of each reception channel of the array antenna to be calibrated is greater than the preset number, the method further includes: adjusting the directional angle of the currently selected beam direction when the number of calibration is determined to be smaller than or equal to the preset number; or transmitting a warning signal for reception channel calibration when the number of calibration is determined to be greater than the preset number.

In one embodiment, before re-calibrating each reception channel of the array antenna to be calibrated in the currently selected beam direction, when the difference between the signal power and the standard signal power is determined to be out of the second preset range, the method further includes: determining if a number of calibration, in the currently selected beam direction, of each transmission channel of the array antenna to be calibrated is greater than a preset number; and after determining if the number of calibration, in the currently selected beam direction, of each transmission channel of the array antenna to be calibrated is greater than the preset number, the method further includes: when the number of calibration is determined to be smaller than or equal to the preset number, re-calibrating, in the currently selected beam direction, each reception channel of the array antenna to be calibrated; or, when the number of calibration is determined to be greater than the preset number, transmitting a warning signal for transmission channel calibration.

In a second aspect, an embodiment of the disclosure provides a device for calibrating an array antenna. The device includes: a first processing unit, configured to transmit a first calibration signal to an array antenna to be calibrated by using a testing antenna oriented in a standard beam direction, and determine differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; where the central channel is a channel corresponding to a central element of the array antenna to be calibrated; and a calibration unit, configured to calibrate an initial beam weight vector matrix according to the differences in both the amplitude and the phase to obtain a compensation beam weight vector matrix, where the initial beam weight vector matrix is determined according to a preset directional angle of each beam direction and each group of initial beam weight vectors corresponds to one of beam directions.

In one embodiment, when calibrating the initial beam weight vector matrix according to the differences in both the amplitude and the phase to obtain the compensation beam weight vector matrix, the calibration unit is configured to compensate for each group of initial beam weight vectors in the initial beam weight vector matrix, respectively, according to the differences in both the amplitude and the phase to obtain the compensation beam weight vector matrix.

In one embodiment, the device further includes a second processing unit. After the initial beam weight vector matrix is calibrated according to the differences in both the amplitude and the phase to obtain the compensation beam weight vector matrix, the second processing unit is configured to: transmit a second calibration signal at a specified power rating to the array antenna to be calibrated by using the testing antenna oriented in the standard beam direction, and determine a standard beam gain of the second calibration signal transmitted by the testing antenna oriented in the standard beam direction and received by the array antenna to be calibrated via each channel according to the compensation beam weight vector matrix; transmit the second calibration signal at the specified power rating to the testing antenna oriented in the standard beam direction by using the array antenna to be calibrated, and determine a standard signal power of the second calibration signal transmitted by the array antenna to be calibrated and received by the testing antenna oriented in the standard beam direction; and for each testing antenna oriented in a beam direction different from the standard beam direction, calibrate each channel of the array antenna to be calibrated in a currently selected beam direction by using a currently selected testing antenna according to the standard beam gain and the standard signal power corresponding to the testing antenna oriented in the standard beam direction.

In one embodiment, when determining the standard beam gain of the second calibration signal transmitted by the testing antenna oriented in the standard beam direction and received by the array antenna to be calibrated via each channel according to the compensation beam weight vector matrix, the second processing unit is configured to: determine a compensation beam weight vector corresponding to the testing antenna oriented in the standard beam direction according to the compensation beam weight vector matrix; and determine the standard beam gain of the second calibration signal transmitted by the testing antenna oriented in the standard beam direction and received by each channel of the array antenna to be calibrated according to the compensation beam weight vector.

In one embodiment, each channel of the array antenna to be calibrated includes a reception channel and a transmission channel.

In one embodiment, the device further includes an updating unit. After the initial beam weight vector matrix is calibrated according to the differences in both the amplitude and the phase to obtain the compensation beam weight vector matrix, the updating unit is configured to:

update the initial beam weight vector matrix of each channel of the array antenna to be calibrated according to the compensation beam weight vector matrix, where each updated reception channel of the array antenna to be calibrated corresponds to a compensation reception beam weight vector matrix, each updated transmission channel corresponds to a compensation transmission beam weight vector matrix, and the compensation reception beam weight vector matrix and the compensation transmission beam weight vector matrix are the compensation beam weight vector matrix, respectively.

In one embodiment, when calibrating each channel of the array antenna to be calibrated in a currently selected beam direction by using a currently selected testing antenna according to the standard beam gain and the standard signal power corresponding to the testing antenna oriented in the standard beam direction, the second processing unit is configured to: transmit a second calibration signal at a specified power rating to the array antenna to be calibrated by using the testing antenna oriented in the currently selected beam direction, and determine a beam gain of the second calibration signal transmitted by the testing antenna and received by the array antenna to be calibrated according to the compensation beam weight vector corresponding to the testing antenna; determine if the difference between the beam gain and the standard beam gain is out of a first preset range; and when the difference between the beam gain and the standard beam gain is determined to be out of the first preset range, adjust a directional angle of the currently selected beam direction, update the compensation reception beam weight vector corresponding to an originally selected beam direction according to an adjusted beam direction, and re-calculate the beam gain of the second calibration signal according to an updated compensation reception beam weight vector until the difference between the beam gain and the standard beam gain falls within the first preset range.

In one embodiment, the second processing unit is further configured to: determine that calibration, in the currently selected beam direction, of each reception channel of the array antenna to be calibrated is completed when the difference between the beam gain and the standard beam gain falls within the first preset range, transmit the second calibration signal at the specified power rating to the testing antenna oriented in the currently selected beam direction by using the array antenna to be calibrated, determine a signal power of the second calibration signal received by the testing antenna and transmitted by the array antenna to be calibrated, and determine if a difference between the signal power and the standard signal power is out of a second preset range; and when the difference between the signal power and the standard signal power is determined to be out of the second preset range, re-calibrate each reception channel of the array antenna to be calibrated in the currently selected beam direction; or when the difference between the signal power and the standard signal power is determined to be fall within the second preset range, determine that calibration, in the currently selected beam direction, of each transmission channel of the array antenna to be calibrated is completed.

In one embodiment, the device further includes a first determining unit. Before the directional angle of the currently selected beam direction is adjusted when the difference between the beam gain and the standard beam gain is determined to be out of the first preset range, the first determining unit is configured to: determine if a number of calibration, in the currently selected beam direction, of each reception channel of the array antenna to be calibrated is greater than a preset number; and after determining if the number of calibration, in the currently selected the beam direction, of each reception channel of the array antenna to be calibrated is greater than the preset number, the first determining unit is configured to: adjust the directional angle of the currently selected beam direction when the number of calibration is determined to be smaller than or equal to the preset number; or, transmit a warning signal for reception channel calibration when the number of calibration is determined to be greater than the preset number.

In one embodiment, the device further includes a second determining unit. Before each reception channel of the array antenna to be calibrated is re-calibrated in the currently selected beam direction, when the difference between the signal power and the standard signal power is determined to be out of the second preset range, the second determining unit is configured to: determine if a number of calibration, in the currently selected beam direction, of each transmission channel of the array antenna to be calibrated is greater than a preset number; and after determining if the number of calibration, in the currently selected beam direction, of each transmission channel of the array antenna to be calibrated is greater than the preset number, the second determining unit is configured to: when the number of calibration is determined to be smaller than or equal to the preset number, re-calibrate, in the currently selected beam direction, each reception channel of the array antenna to be calibrated; or, when the number of calibration is determined to be greater than the preset number, transmit a warning signal for transmission channel calibration.

In a third aspect, an embodiment of the disclosure provides an electronic device. The electronic device includes one or more processors and one or more computer-readable mediums. The one or more computer-readable mediums store a program for calibrating an array antenna.

The one or more processors are configured to execute the program to perform the method according to any one of the implementation modes of the embodiment in the first aspect.

In a fourth aspect, an embodiment of the disclosure provides one or more computer-readable mediums. The one or more computer-readable mediums store a program for calibrating an array antenna. When one or more processors execute the program, a communication device performs the method according to any one of the implementation modes of the embodiment in the first aspect.

According to the embodiments of the disclosure, a first calibration signal is transmitted to the array antenna to be calibrated via the testing antenna oriented in the standard beam direction, the differences in amplitude and phase between the first calibration signal received via the central channel and the first calibration signal received by each channel are determined according to the first calibration signal received by each channel of the array antenna to be calibrated, and the initial beam weight vector matrix is calibrated according to the differences in both the amplitude and the phase to obtain the compensation beam weight vector matrix. The initial beam weight vector matrix is determined by preset directional angles of various beam directions and each group of initial beam weight vectors corresponds to a beam direction. As such, the beamforming of the array antenna could be detected effectively in an open environment to calibrate differences in amplitude and phase of each channel of the array antenna, so that the method and device according to the embodiments of the disclosure are applicable to massive production of array antennas.

DETAILED DESCRIPTION OF THE EMBODIMENTS

Figure 1:
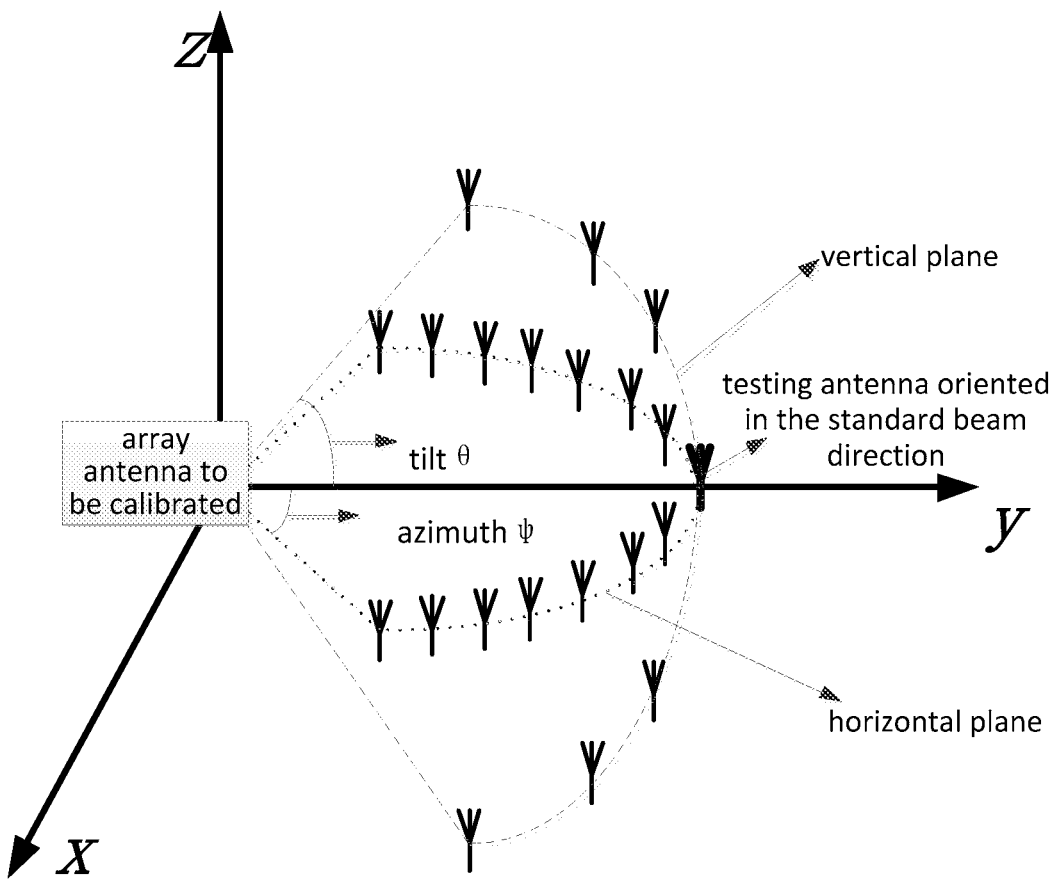
FIG. 1 is a schematic diagram of a calibration environment according to an embodiment of the disclosure.

In order to make the objects, technical solutions, and advantages of the embodiments of the disclosure more apparent, the technical solutions according to the embodiments of the disclosure will be described below clearly and fully with reference to the accompanying drawings. Apparently the embodiments to be described below are only a part but not all of the embodiments of the disclosure. Based upon the embodiments of the disclosure described herein, all other embodiments which can occur to those ordinarily skilled in the art without making any inventive effort shall fall into the scope of the disclosure.

It shall be appreciated that the technical solutions according to the embodiments of the disclosure can be applicable to various communication systems, e.g., a global system of mobile communication (hereinafter "GSM") system, a code division multiple access (hereinafter "CDMA") system, a wideband code division multiple access (hereinafter "WCDMA") system, a general packet radio service (hereinafter "GPRS") system, a long term evolution (hereinafter "LTE") system, an advanced long term evolution (hereinafter "LTE-A") system, a universal mobile telecommunication system (hereinafter "UMTS"), a new radio (hereinafter "NR") system, and etc.

It shall be further appreciated that according to the embodiments of the disclosure, user equipment (hereinafter "UE") includes but is not be limited to a mobile station (hereinafter "MS"), a mobile terminal, a mobile telephone, a handset, portable equipment, and etc. The user equipment can communicate with one or more core networks via a radio access network (hereinafter "RAN"). For example, the user equipment can be a mobile phone (or a cell phone) or a computer having a function of radio communication, or the user equipment can be a portable, pocket, handheld, built-in-computer, or on-vehicle mobile apparatus.

According to the embodiments of the disclosure, a base station (e.g., an access point) can be an apparatus in an access network that communicates with a radio terminal over one or more sectors via an air interface. The base station can be configured to convert a received air frame into an internet protocol (hereinafter "IP") packet and convert a received IP packet into an air frame, and operate as a router between the radio terminal and the remaining components of the access network, where the remaining components of the access network can include an IP network. The base station can further coordinate attribute management of the air interface. For example, the base station can be a base transceiver station (hereinafter "BTS") in a GSM or CDMA system, a Node B in a TD-SCDMA or a WCDMA system, an evolutional Node B (or referred to as eNodeB, eNB or e-Node B) in an LTE system, or a base station (hereinafter "gNB") in a 5G NR system, although the disclosure is not limited thereto.

In order to calibrate an array antenna in real time in an open calibration environment, embodiments of the disclosure redesign a method for calibrating the array antenna. The method includes: transmitting a first calibration signal to an array antenna to be calibrated by using a testing antenna oriented in a standard beam direction; determining differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; and calibrating an initial beam weight vector matrix based on the differences in both the amplitude and the phase to obtain a compensation beam weight vector matrix; where the initial beam weight vector matrix is determined according to a preset directional angle of each beam direction and each group of initial beam weight vectors corresponds to one of beam directions.

The technical solutions according to the embodiments of the disclosure will be described below clearly and fully with reference to the accompanying drawings. Apparently the embodiments to be described below are only a part but not all of the embodiments of the disclosure. Based upon the embodiments of the disclosure described herein, all the other embodiments which can occur to those ordinarily skilled in the art without making any inventive effort shall fall into the scope of the disclosure.

The technical solutions according to the disclosure will be described below clearly, and of course, the disclosure is not limited to the following embodiments.

According to an embodiment of the disclosure, a calibration environment must be set up before calibrating an array antenna to be calibrated, so as to provide a stable electromagnetic environment which satisfies far-field testing conditions. Specifically, a plurality of testing antennas are placed corresponding to different beam directions of the array antenna to be calibrated, respectively, or, at least one testing antenna is moved across the different beam directions. Whichever method is used, the essence is to calibrate channels corresponding to the different beam directions of the array antenna to be calibrated.

For the convenience of description, the calibration environment where a plurality of testing antennas are placed corresponding to different beam directions of the array antenna to be calibrated is taken as an example herein. Specifically, one of the testing antennas is placed corresponding to one of beam directions (hereinafter "a testing antenna oriented in a beam direction"). Each of the beam directions has a directional angle, and the directional angle includes at least an azimuth on the horizontal plane and a tilt on the vertical plane. In other words, a testing antenna oriented in a beam direction corresponds to a group of the azimuth and the tilt. Azimuths and tilts corresponding to testing antennas oriented in different beam directions are different.

As illustrated in FIG. 1, the testing antennas connected by dotted lines represent the testing antennas placed on the horizontal plane (x-y). Angles between the testing antennas on the horizontal plane and the array antenna to be calibrated are azimuths, which are denoted by φ. The testing antennas connected by dashed lines represent the testing antennas on the vertical plane (y-z). Angles between the testing antennas on the vertical plane and the array antenna to be calibrated are tilts, which are denoted by θ.

According to embodiments of the disclosure, the calibration environment can be re-used, instead of re-building a calibration environment whenever a calibration of an array antenna is to be performed.

Figure 2:
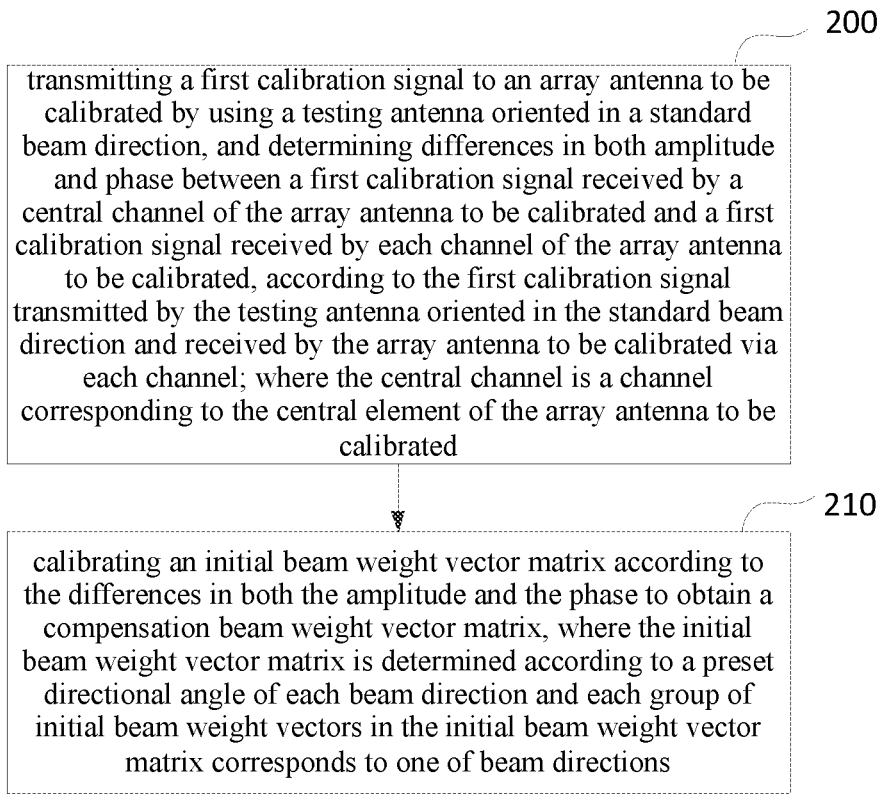
FIG. 2 is a flow chart of a method for calibrating an array antenna according to an implementation mode of the embodiment of the disclosure.

Implementation mode 1:

As illustrated in FIG. 2, a method for calibrating an array antenna according to an implementation mode of the embodiment of the disclosure includes steps 200 and 210.

Step 200: transmitting a first calibration signal to an array antenna to be calibrated by using a testing antenna oriented in a standard beam direction, and determining differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; where the central channel is a channel corresponding to the central element of the array antenna to be calibrated.

The testing antenna oriented in the standard beam direction is a testing antenna on the same horizontal line of the array antenna to be calibrated. That is, the azimuth and tilt of the directional angle corresponding to the standard beam direction are zero. The central channel refers to the channel corresponding to the central element of the array antenna to be calibrated and is one of the channels of the array antenna to be calibrated.

Step 210: calibrating an initial beam weight vector matrix according to the differences in both the amplitude and the phase to obtain a compensation beam weight vector matrix, where the initial beam weight vector matrix is determined according to a preset directional angle of each beam direction and each group of initial beam weight vectors in the initial beam weight vector matrix corresponds to one of beam directions.

The compensation beam weight vector matrix is obtained through the steps 200-201, so that each channel of the array antenna is preliminarily calibrated in the standard beam direction.

Figure 3A:
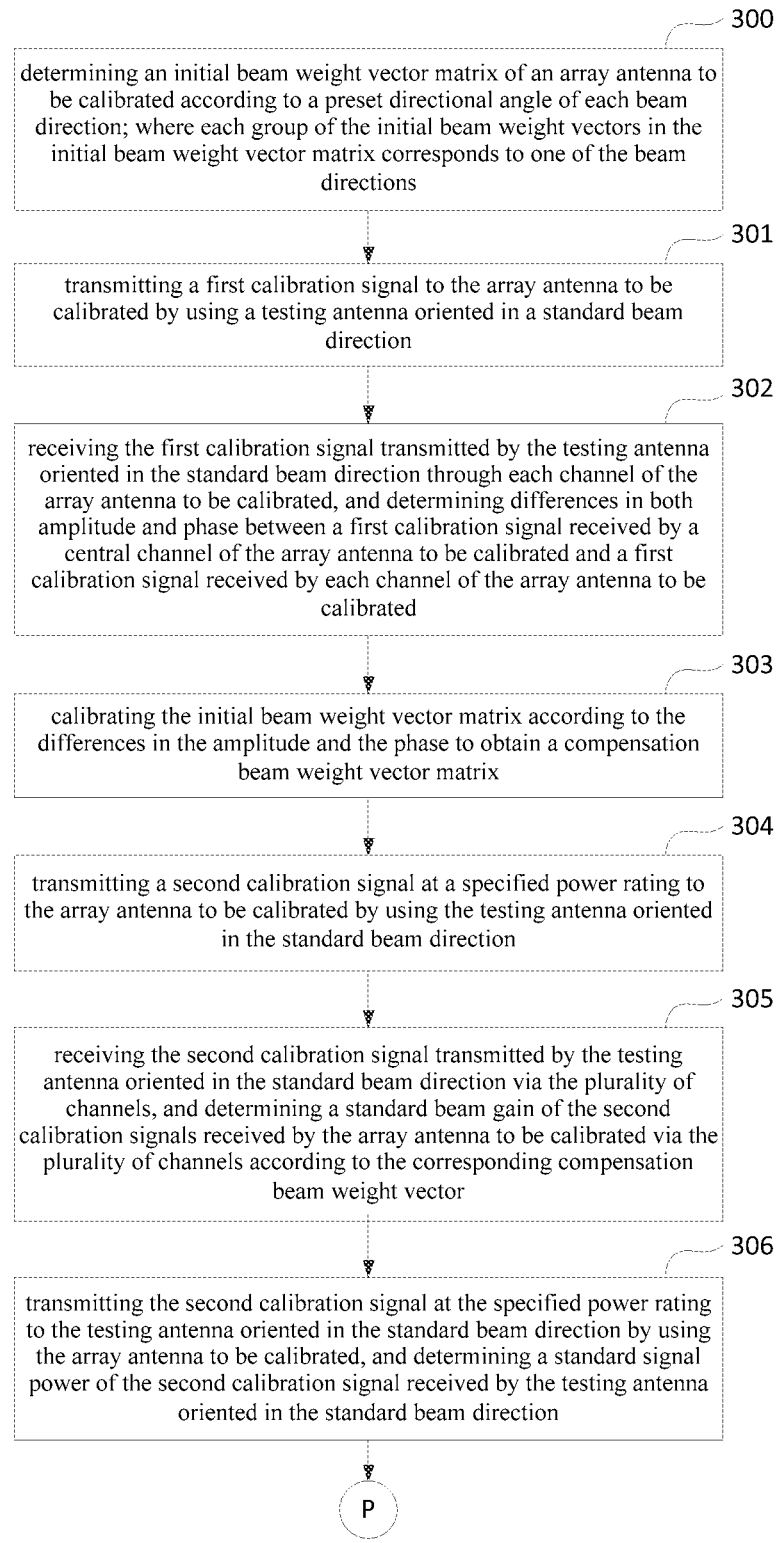
FIGS. 3a and 3b are flow charts of another method for calibrating an array antenna according to another implementation mode of the embodiment of the disclosure.
Figure 3B:
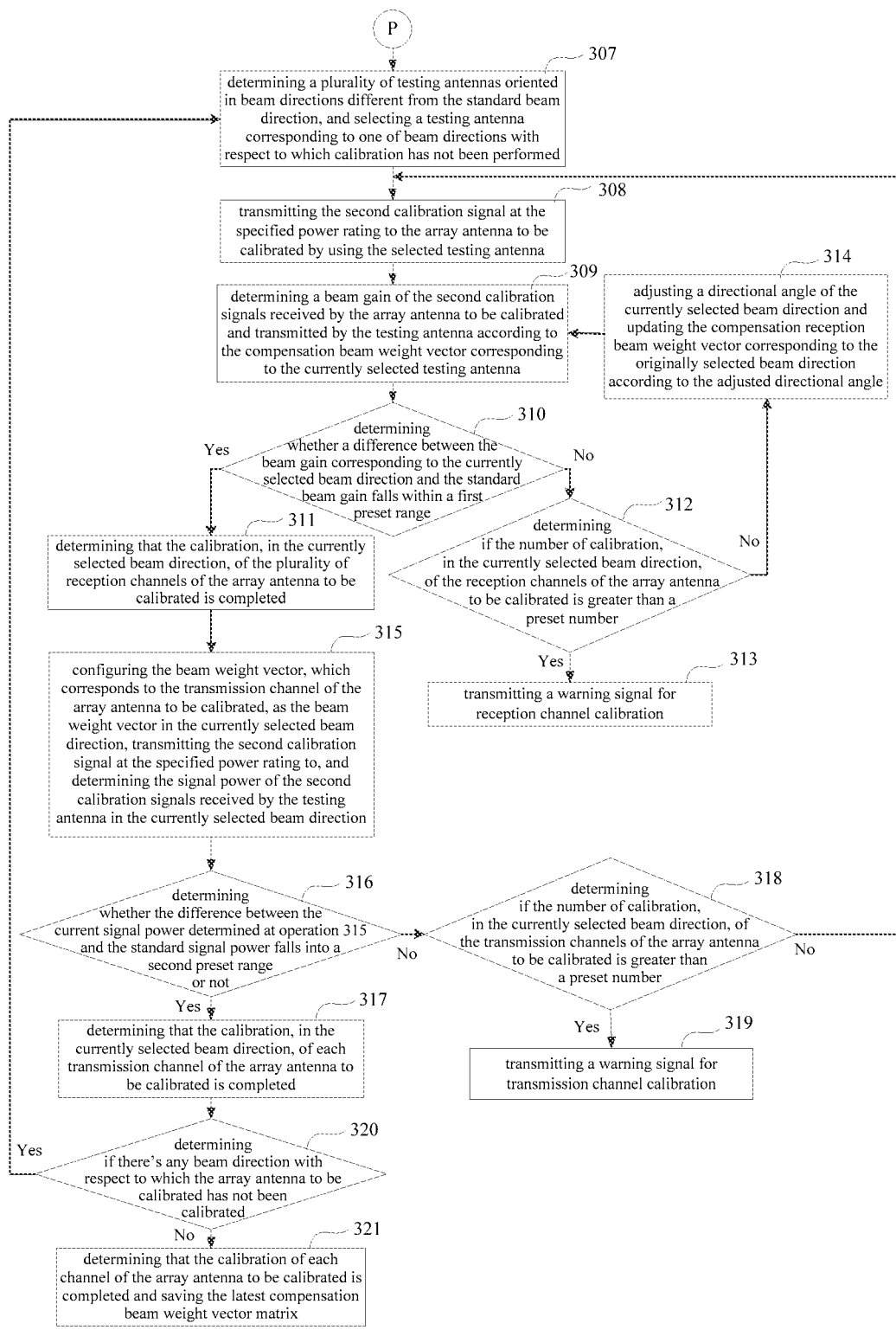

As illustrated in FIG. 3, a method for calibrating an array antenna according to another implementation mode of the embodiment of the disclosure includes steps 300-321.

Step 300: determining an initial beam weight vector matrix of an array antenna to be calibrated according to a preset directional angle of each beam direction; where each group of the initial beam weight vectors in the initial beam weight vector matrix corresponds to one of the beam directions.

Specifically, the initial beam weight vector matrix of the array antenna to be calibrated is determined according to directional angle of each beam direction in the current calibration environment; where each group of the initial beam weight vectors in the initial beam weight vector matrix corresponds to one of the beam directions, and a direction of each group of the initial beam weight vectors is the corresponding directional angle respectively.

In one embodiment, the initial beam weight vector matrix W is represented as $W=[w(\theta_1, \varphi_1), w(\theta_2, \varphi_2), \ldots, w(\theta_Q, \varphi_Q)]^T$, where φ represents an azimuth of a corresponding testing antenna, θ represents a tilt of a corresponding testing antenna, Q represents the number of testing antennas oriented in different beam directions, $w(\theta_Q, \varphi_Q)$ represents a group of beam weight vectors and dimensions of $w(\theta_Q, \varphi_Q)$ are the number of channels corresponding to the array antenna to be calibrated, which is N.

For example, for a testing antenna oriented in a beam direction whose azimuth and tilt are zero, the corresponding beam weight vector is: $w(0°, 0°)=1_{N\times 1}$. That is, the magnitude of the beam weight vector is 1, the azimuth and tilt of the directional angle corresponding to the beam weight vector are 0.

Moreover, the array antenna to be calibrated has the function of transmitting and reception signals. Therefore, the array antenna to be calibrated has reception channels and transmission channels. In the current calibration environment, there is an initial reception beam weight vector matrix corresponding to the reception channels of the array antenna to be calibrated, and an initial transmission beam weight vector matrix corresponding to the transmission channels. According to the implementation mode of the embodiment of the disclosure, the initial reception beam weight vector matrix and the initial transmission beam weight vector matrix are the same and equal to the initial beam weight vector matrix.

In one embodiment, according to the implementation mode of the embodiment of the disclosure, the initial reception beam weight vector matrix $W_{RX}$ of the reception channels and the initial transmission beam weight vector matrix $W_{TX}$ of the transmission channels may be represented as: $W_{RX}=W$, and $W_{TX}=W$.

Step 301: transmitting a first calibration signal to the array antenna to be calibrated by using a testing antenna oriented in a standard beam direction.

Specifically, the testing antenna oriented in the standard beam direction is used to transmit the first calibration signal to the array antenna to be calibrated. In one embodiment, according to the embodiment of the disclosure, the directional angle of the standard beam direction is 0, i.e., the azimuth and tilt are zero respectively. The first calibration signal may be a single tone calibration signal.

Step 302: receiving the first calibration signal transmitted by the testing antenna oriented in the standard beam direction through each channel of the array antenna to be calibrated, and determining differences in both amplitude and phase between a first calibration signal received by a central channel of the array antenna to be calibrated and a first calibration signal received by each channel of the array antenna to be calibrated.

Specifically, the array antenna to be calibrated receives the first calibration signal transmitted by the testing antenna oriented in the standard beam direction through a plurality of channels, and uses the first calibration signal received by the central channel as a reference to determine the differences in both amplitude and phase between the first calibration signal received by the central channel and those received by each of the plurality of channels, respectively. Where the central channel is one of the plurality of channels which corresponds to a central element of the array antenna to be calibrated.

For example, the first calibration signals received by the array antenna to be calibrated through N channels are $x_0(t)$, $x_1(t)$, ..., $x_{N-1}(t)$, and the first calibration signal received by the central channel corresponding to the central element of the array antenna to be calibrated is $x_0(t)$, which is used as a reference.

In one embodiment, according to the implementation mode of the embodiment of the disclosure, the difference in amplitude and phase between the first calibration signal received by the central channel and the first calibration signal received by any one of the plurality of channels, which is represented as $e_n$, is calculated by $$e_n = \frac{E\{x_0(t)\}}{E\{x_n(t)\}}, n = 0, 1, 2, \ldots, N-1,$$

where any one of reception channels includes the central channel.

Furthermore, the differences in amplitude and phase between the first calibration signal received by the central channel and the first calibration signals received by the plurality of channels, which is represented as e, are calculated by $e=[1, e_1, e_2, \ldots, e_{N-1}]^T$, where "1" represents the difference in amplitude and phase between the first calibration signal received by the central channel itself.

Step 303: calibrating the initial beam weight vector matrix according to the differences in the amplitude and the phase to obtain a compensation beam weight vector matrix.

Specifically, after the differences in the amplitude and the phase between the first calibration signals received by each channel and the first calibration signal received by the central channel are determined, respectively, each group of initial beam weight vectors in the initial beam weight vector matrix are compensated for according to the differences to form the compensation beam weight vector matrix.

For example, obtained corresponding differences in amplitude and phase, e, are used to compensate for the errors in amplitude and phase of the initial beam weight vector matrix W to obtain the compensation beam weight vector matrix $W_c$.

In one embodiment, the compensation may be dot product operation. Then the compensation result for any one of the groups of initial beam weight vectors, $w(\theta_q, \varphi_q)$, is calculated according to the corresponding differences in amplitude and phase, e, by $w_1(\theta_q, \varphi_q)=e \bullet w(\theta_q, \varphi_q)$, where "•" represents dot product, $w(\theta_q, \varphi_q)$ represents the initial beam weight vector corresponding to a $q^{th}$ beam direction, and $w_1(\theta_q, \varphi_q)$ represents a compensation beam weight vector corresponding to the $q^{th}$ beam direction.

Furthermore, the compensation beam weight vector matrix $W_c$ is calculated by $W_c=[w_1(\theta_1, \varphi_1), w_1(\theta_2, \varphi_2), \ldots, w_1(\theta_Q, \varphi_Q)]^T$, where $w_1(\theta_Q, \varphi_Q)$ is the compensation beam weight vector of a testing antenna oriented in a $Q^{th}$ beam direction.

Since there are differences in amplitude and phase among channels of the array antenna to be calibrated, even if each of the plurality of channels receives a same signal transmitted by a same transmitter, the signals received by the plurality of channels would be different in amplitude and phase due to the differences in amplitude and phase among the channels. Therefore, in the above-mentioned operations, at first, the testing antenna oriented in the standard beam direction is used to transmit the first calibration signal to the array antenna to be calibrated, then the differences in amplitude and phase among the first calibration signals received by the plurality of channels of the array antenna to be calibrated are determined and are used to compensate for the initial beam weight vector matrix to calibrate the amplitudes and phases of each channel of the array antenna to be calibrated in the standard beam direction.

The compensation beam weight vector matrix is used to update the initial beam weight vector matrix of each of the channels of the array antenna to be calibrated. After the update, there is a compensation reception beam weight vector matrix corresponding to each of the reception channels of the array antenna to be calibrated, and a compensation transmission beam weight vector matrix corresponding to each of the transmission channels of the array antenna to be calibrated. The compensation reception beam weight vector matrix and the compensation transmission beam weight vector matrix are equal to the compensation beam weight vector matrix, respectively.

In one embodiment, the compensation reception beam weight vector matrix $W'_{RX}$ of each of the reception channels of the array antenna to be calibrated and the compensation transmission beam weight vector matrix $W'_{TX}$ corresponding to each of the transmission channels are represented as: $W'_{RX}=W_c$ and $W'_{TX}=W_c$.

Step 304: transmitting a second calibration signal at a specified power rating to the array antenna to be calibrated by using the testing antenna oriented in the standard beam direction.

Specifically, after the compensation beam weight vector matrix of the channels (including the reception channels and the transmission channels) of the array antenna to be calibrated is determined, the testing antenna oriented in the standard beam direction is used to transmit the second calibration signal at the specified power rating to the array antenna to be calibrated.

For example, the testing antenna having $\theta_q=0°$ and $\varphi_q=0°$ is used to transmit the second calibration signal to the array antenna to be calibrated at the power rating $P_0$.

Step 305: receiving the second calibration signal transmitted by the testing antenna oriented in the standard beam direction via the plurality of channels, and determining a standard beam gain of the second calibration signals received by the array antenna to be calibrated via the plurality of channels according to the corresponding compensation beam weight vector.

Specifically, after the testing antenna oriented in the standard beam direction transmits the second calibration signal to the array antenna to be calibrated at the preset power rating, the array antenna to be calibrated receives the second calibration signal transmitted by the testing antenna oriented in the standard beam direction via the plurality of channels, and determines the compensation beam weight vector corresponding to the testing antenna oriented in the standard beam direction according to the obtained compensation beam weight vector matrix. Then the standard beam gain of the second calibration signals received by the array antenna to be calibrated via the plurality of channels is determined according to the corresponding compensation beam weight vectors.

In one embodiment, according to the embodiment of the disclosure, the standard beam gain $G_{RX0}$ of the second calibration signal transmitted by the testing antenna oriented in the standard beam direction at the power rating of $P_0$ and received by the array antenna to be calibrated is calculated by $$G_{RX0} = 10\log 10\left(\frac{E\{|w_1^H(0°, 0°)x(t)|^2\}}{P_0}\right),$$

where $w_1(0°, 0°)$ is the compensation beam weight vector corresponding to the standard beam direction, and $x(t)=[x_0(t), x_1(t), \ldots, x_{N-1}(t)]^T$, i.e., x(t) is the second calibration signals transmitted by the testing antenna oriented in the standard beam direction and received by the array antenna to be calibrated via the plurality of channels.

As such, the obtained standard beam gain is the reception beamforming index of the array antenna to be calibrated in the standard beam direction.

Step 306: transmitting the second calibration signal at the specified power rating to the testing antenna oriented in the standard beam direction by using the array antenna to be calibrated, and determining a standard signal power of the second calibration signal received by the testing antenna oriented in the standard beam direction.

Specifically, the array antenna to be calibrated transmits the second calibration signal at the specified power rating to the testing antenna oriented in the standard beam direction via the plurality of channels and the standard signal power corresponding to the second calibration signal received by the testing antenna oriented in the standard beam direction is determined.

According to the embodiment of the disclosure, the method of determining the standard signal power of the second calibration signal received by the testing antenna oriented in the standard beam direction may be an existing method and is not introduced further herein.

For example, the array antenna to be calibrated transmits the second calibration signal at the power rating of $P_0$, and the standard signal power corresponding to the second calibration signal received by the testing antenna oriented in the standard beam direction is $P_B$.

As such, the obtained standard signal power is the transmitting beamforming index of the array antenna to be calibrated in the standard beam direction.

Step 307: determining a plurality of testing antennas oriented in beam directions different from the standard beam direction, and selecting a testing antenna corresponding to one of beam directions with respect to which calibration has not been performed.

According to the implementation mode of the embodiment of the disclosure, the channels of the array antenna to be calibrated are to be calibrated in different beam directions to rectify the channel errors. In the steps above, the channels of the array antenna to be calibrated (including the reception channels and the transmission channels) are calibrated in the standard beam direction to obtain the compensation beam weight vector matrix corresponding to each channel, and then each channel of the array antenna to be calibrated is calibrated in the other beam directions according to the standard beam direction.

Specifically, a testing antenna, corresponding to a beam direction with respect to which no calibration has been performed, among the plurality of testing antennas oriented in all the beam directions different from the standard beam direction, is selected to perform the operations below.

Step 308: transmitting the second calibration signal at the specified power rating to the array antenna to be calibrated by using the selected testing antenna.

Specifically, the testing antenna oriented in the currently selected beam direction is used to transmit the second calibration signal to the array antenna to be calibrated.

For example, the testing antenna having $\theta_k=15°$ and $\varphi_k=15°$ is used to transmit the second calibration signal at the power rating $P_0$ to the array antenna to be calibrated.

Step 309: determining a beam gain of the second calibration signals received by the array antenna to be calibrated and transmitted by the testing antenna according to the compensation beam weight vector corresponding to the currently selected testing antenna.

Specifically, after the testing antenna oriented in the currently selected beam direction transmits the second calibration signal to the array antenna to be calibrated at the preset power rating, the array antenna to be calibrated receives the transmitted second calibration signals via the plurality of channels. The compensation beam weight vector corresponding to the testing antenna oriented in the currently selected beam direction is determined according to the obtained compensation beam weight vector matrix. Then the beam gain of the second calibration signals received by array antenna to be calibrated via the plurality of channels is determined according to compensation beam weight vector.

In one embodiment, the beam gain $G_{RXk}$ of the second calibration signal transmitted at the power rating $P_0$ by a testing antenna whose beam direction corresponds to $\theta_k$, $\varphi_k$ and received by the array antenna to be calibrated is calculated as $$G_{RXk} = 10\log 10\left(\frac{E\{|w_1^H(\theta_k, \varphi_k)x(t)|^2\}}{P_0}\right),$$

where $w_1(\theta_k, \varphi_k)$ represents the compensation beam weight vector corresponding to the testing antenna whose beam direction is $\theta_k$, $\varphi_k$, and $x(t)=[x_0(t), x_1(t), \ldots, x_{N-1}(t)]^T$, that is, x(t) is the second calibration signals received by the array antenna to be calibrated via the plurality of channels and transmitted by the testing antenna whose beam direction is $\theta_k$, $\varphi_k$.

Step 310: determining whether a difference between the beam gain corresponding to the currently selected beam direction and the standard beam gain falls within a first preset range. If so, step 311 is performed, otherwise step 312 is performed.

Specifically, whether the difference between the beam gain corresponding to the second calibration signals received by the array antenna to be calibrated via each of the reception channels in the currently selected beam direction and the standard beam gain corresponding to the second calibration signals received by the array antenna to be calibrated via each of the reception channels in the standard beam direction falls into the first preset range. If so, the step 311 is performed. Otherwise, the step 312 is performed.

In the step 310, the second calibration signals are transmitted at the power rating to the array antenna to be calibrated by the testing antenna oriented in the currently selected beam direction and the testing antenna oriented in the standard beam direction, respectively, to determine the difference between the beams gains of the array antenna to be calibrated when calibration signals of the same power transmitted from different beam directions are received by the reception channels of the array antenna to be calibrated.

Step 311: determining that the calibration, in the currently selected beam direction, of the plurality of reception channels of the array antenna to be calibrated is completed.

Specifically, when the difference between the beam gain corresponding to the second calibration signals received by the plurality of reception channels of the array antenna to be calibrated in the currently selected beam direction and the standard beam gain corresponding to the second calibration signals received by the plurality of reception channels of the array antenna to be calibrated in the standard beam direction falls within the preset range, the calibration, in the beam direction of the currently selected testing antenna, of the reception channels of the array antenna to be calibrated is completed. That is, there is no need to further calibrate the compensation reception beam weight vector corresponding to the currently selected beam direction in the above compensation reception beam weight vector matrix.

For example, the currently selected beam direction is $\theta_k$, $\varphi_k$, then the compensation reception beam weight vector $w_1(\theta_k, \varphi_k)$ in the compensation reception beam weight vector matrix $W_{RX}$ does not need to be calibrated any more.

Step 312: determining if the number of calibration, in the currently selected beam direction, of the reception channels of the array antenna to be calibrated is greater than a preset number. If so, step 313 is performed, otherwise step 314 is performed.

Step 313: transmitting a warning signal for reception channel calibration.

Specifically, it means that the calibration has been performed too many times when the number of calibration, in the currently selected beam direction, of the reception channels of the array antenna to be calibrated is greater than the preset number, and a warning signal for reception channel calibration may be transmitted.

Step 314: adjusting a directional angle of the currently selected beam direction and updating the compensation reception beam weight vector corresponding to the originally selected beam direction according to the adjusted directional angle.

Specifically, when the number of calibration, in the currently selected beam direction, of the reception channels of the array antenna to be calibrated is not greater than the preset number, the differences in amplitude and phase between the second calibration signal received by the central channel and the second calibration signals received by the plurality of channels are determined, the directional angel of the currently selected beam direction is adjusted according to a preset angle, and then the compensation reception beam weight vector corresponding to the currently selected beam direction is updated according to the differences in amplitude and phase and the adjusted directional angle.

In one embodiment, according to the embodiment of the disclosure, the differences in amplitude and phase, $e_k$, between the second calibration signal received by the central channel and the second calibration signals received by the plurality of channels are calculated as follows.

For example, suppose the second calibration signals received by the array antenna to be calibrated via N channels are $y_0(t), y_1(t), \ldots, y_{N-1}(t)$, and the second calibration signal received by the central channel corresponding to the central element of the array antenna to be calibrated is $y_0(t)$, which is used as a reference.

In one embodiment, the difference in amplitude and phase, $e_n$, between the second calibration signals received by the central channel and by any channel is calculated as $$e_n = \frac{E\{x_0(t)\}}{E\{x_n(t)\}}, n = 0, 1, 2, \ldots, N-1,$$

where any one of the reception channels includes the central channel.

Further, the differences in amplitude and phase, $e_k$, between the second calibration signal received by the central channel and the second calibration signals received by each channel are represented as $e_k = [1, e_1, e_2, \ldots, e_{N-1}]^T$, where "1" represents the difference in amplitude and phase between the signals received by the central channel itself.

Then, The directional angle of the currently selected beam direction is then adjusted according to the preset angle.

For example, the preset angle is 2.5° and the directional angle corresponding to the currently selected beam direction is $(\theta_k, \varphi_k)$. Then the adjusted directional angle $(\theta, \varphi)$ satisfies $(\theta, \varphi) \in [\theta_k-2.5°, \theta_k+2.5°] \cup [\varphi_k-2.5°, \varphi_k+2.5°]$.

Finally, the compensation reception beam weight vector corresponding to the originally selected beam direction is updated according to the obtained differences in amplitude and phase and the adjusted directional angle. In one embodiment, according to the embodiment of the disclosure, the updated compensation reception beam weight vector $w_{rx}(\theta, \varphi)$ is determined by $w_{rx}(\theta, \varphi) = w_1(\theta, \varphi) \bullet e_k \div w_1(\theta_k, \varphi_k)$, where $(\theta, \varphi)$ is the adjusted directional angle, $w_1(\theta_k, \varphi_k)$ is the compensation receive beam weight vector corresponding to the originally selected beam direction, "•" represents dot product, and "÷" represents dot division.

After the corresponding compensation reception beam weight vector is updated, the step 309 is performed again.

Step 315: configuring the beam weight vector, which corresponds to the transmission channel of the array antenna to be calibrated, as the beam weight vector in the currently selected beam direction, transmitting the second calibration signal at the specified power rating to, and determining the signal power of the second calibration signals received by the testing antenna in the currently selected beam direction.

Specifically, after the calibration, in the currently selected beam direction, of the reception channels of the array antenna to be calibrated is completed, the transmission channels of the array antenna to be calibrated are calibrated in the currently selected beam direction. Firstly, the beam weight vector, which corresponds to the transmission channel of the array antenna to be calibrated, is configured as the beam weight vector in the currently selected beam direction, then each of the transmission channels of the array antenna to be calibrated is used to transmit the second calibration signal at the specified power rating and the signal power of the second calibration signals received by the testing antenna in the currently selected beam direction is determined.

For example, suppose that the array antenna to be calibrated transmits the second calibration signal at the power rating of $P_0$, and the standard signal power corresponding to the second calibration signals received by the testing antenna oriented in the currently selected beam direction is $P_c$.

Step 316: determining whether the difference between the current signal power determined at step 315 and the standard signal power falls into a second preset range or not. If so, step 317 is performed, otherwise step 318 is performed.

Specifically, determining whether the difference between the signal power corresponding to the second calibration signal transmitted by the transmission channels of the array antenna to be calibrated and received by the currently selected testing antenna and the standard signal power corresponding to the second calibration signal transmitted by the transmission channels of the array antenna to be calibrated and received by the testing antenna oriented in the standard beam direction falls within the second preset range, and if so, step 317 is performed, otherwise step 318 is performed.

Step 317: determining that the calibration, in the currently selected beam direction, of each transmission channel of the array antenna to be calibrated is completed.

Specifically, when the difference between the signal power corresponding to the second calibration signal transmitted by each transmission channel of the array antenna to be calibrated and received by the currently selected testing antenna and the standard signal power corresponding to the second calibration signal transmitted by each transmission channel of the array antenna to be calibrated and received by the testing antenna oriented in the standard beam direction falls within the second preset range, the calibration, in the currently selected beam direction, of each transmission channel of the array antenna to be calibrated is determined to be completed. That is, there's no need to further calibrate the compensation transmission beam weight vector corresponding to the currently selected beam direction in the above compensation transmission beam weight vector matrix.

Step 318: determining if the number of calibration, in the currently selected beam direction, of the transmission channels of the array antenna to be calibrated is greater than a preset number. If so, performing step 319, otherwise returning to the step 308.

Step 319: transmitting a warning signal for transmission channel calibration.

Specifically, when the number of calibration, in the currently selected beam direction, of each transmission channel of the array antenna to be calibrated is greater than the preset number, it means that the transmission channels have been calibrated for too many times and the warning signal for transmission channel calibration may be transmitted.

Step 320: determining if there's any beam direction with respect to which the array antenna to be calibrated has not been calibrated. If so, performing the step 307, otherwise performing step 321.

Specifically, each channel of the array antenna to be calibrated is to be calibrated in different beam directions. After the calibration, in the currently selected beam direction, of the array antenna to be calibrated is completed, it is determined whether there are still any beam directions with respect to which no calibration has been performed, and if so, the process goes back to the step 307 to calibrate in the next beam direction, otherwise the step 321 is performed.

Step 321: determining that the calibration of each channel of the array antenna to be calibrated is completed and saving the latest compensation beam weight vector matrix.

Specifically, after the calibration, in each beam direction, of the reception channels and transmission channels of the array antenna to be calibrated is completed, the calibration of each channel of the array antenna to be calibrated is completed and the latest compensation beam weight vector matrix is saved.

Figure 4:
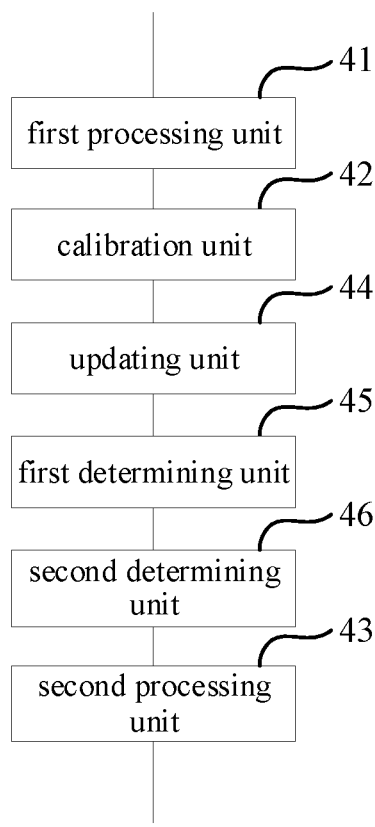
FIG. 4 is a schematic diagram of a structure of a device for calibrating an array antenna according to an embodiment of the disclosure.

As illustrated in FIG. 4, an embodiment of the disclosure provides a device for calibrating an array antenna. The device at least includes a first processing unit 41 and a calibration unit 42.

The first processing unit 41 is configured to transmit a first calibration signal to an array antenna to be calibrated by using a testing antenna oriented in a standard beam direction, and determine differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; wherein the central channel is a channel corresponding to a central element of the array antenna to be calibrated.

The calibration unit 42 is configured to calibrate an initial beam weight vector matrix according to the differences in both the amplitude and the phase to obtain a compensation beam weight vector matrix, wherein the initial beam weight vector matrix is determined according to a preset directional angle of each beam direction and each group of initial beam weight vectors corresponds to one of beam directions.

In one embodiment, when calibrating the initial beam weight vector matrix according to the differences in both the amplitude and the phase to obtain the compensation beam weight vector matrix, the calibration unit 42 is configured to compensate for each group of initial beam weight vectors in the initial beam weight vector matrix, respectively, according to the differences in both the amplitude and the phase to obtain the compensation beam weight vector matrix.

In one embodiment, the device further includes a second processing unit 43. After the initial beam weight vector matrix is calibrated according to the differences in both the amplitude and the phase to obtain the compensation beam weight vector matrix, the second processing unit 43 is configured to: transmit a second calibration signal at a specified power rating to the array antenna to be calibrated by using the testing antenna oriented in the standard beam direction, and determine a standard beam gain of the second calibration signal transmitted by the testing antenna oriented in the standard beam direction and received by the array antenna to be calibrated via each channel according to the compensation beam weight vector matrix; transmit the second calibration signal at the specified power rating to the testing antenna oriented in the standard beam direction by using the array antenna to be calibrated, and determine a standard signal power of the second calibration signal transmitted by the array antenna to be calibrated and received by the testing antenna oriented in the standard beam direction; and for each testing antenna oriented in a beam direction different from the standard beam direction, calibrate each channel of the array antenna to be calibrated in a currently selected beam direction by using a currently selected testing antenna according to the standard beam gain and the standard signal power corresponding to the testing antenna oriented in the standard beam direction.

In one embodiment, when determining the standard beam gain of the second calibration signal transmitted by the testing antenna oriented in the standard beam direction and received by the array antenna to be calibrated via each channel according to the compensation beam weight vector matrix, the second processing unit 43 is configured to:

determine a compensation beam weight vector corresponding to the testing antenna oriented in the standard beam direction according to the compensation beam weight vector matrix; and determine the standard beam gain of the second calibration signal transmitted by the testing antenna oriented in the standard beam direction and received by each channel of the array antenna to be calibrated according to the compensation beam weight vector.

In one embodiment, each channel of the array antenna to be calibrated includes a reception channel and a transmission channel. The device further includes an updating unit 44. After the initial beam weight vector matrix is calibrated according to the differences in both the amplitude and the phase to obtain the compensation beam weight vector matrix, the updating unit 44 is configured to: update the initial beam weight vector matrix of each channel of the array antenna to be calibrated according to the compensation beam weight vector matrix, where each updated reception channel of the array antenna to be calibrated corresponds to a compensation reception beam weight vector matrix, each updated transmission channel corresponds to a compensation transmission beam weight vector matrix, and the compensation reception beam weight vector matrix and the compensation transmission beam weight vector matrix are the compensation beam weight vector matrix, respectively.

In one embodiment, when calibrating each channel of the array antenna to be calibrated in a currently selected beam direction by using a currently selected testing antenna according to the standard beam gain and the standard signal power corresponding to the testing antenna oriented in the standard beam direction, the second processing unit 43 is configured to: transmit a second calibration signal at a specified power rating to the array antenna to be calibrated by using the testing antenna oriented in the currently selected beam direction, and determine a beam gain of the second calibration signal transmitted by the testing antenna and received by the array antenna to be calibrated according to the compensation beam weight vector corresponding to the testing antenna; determine if the difference between the beam gain and the standard beam gain is out of a first preset range; and when the difference between the beam gain and the standard beam gain is determined to be out of the first preset range, adjust a directional angle of the currently selected beam direction, update the compensation reception beam weight vector corresponding to an originally selected beam direction according to an adjusted beam direction, and re-calculate the beam gain of the second calibration signal according to an updated compensation reception beam weight vector until the difference between the beam gain and the standard beam gain falls within the first preset range.

In one embodiment, the second processing unit 43 is further configured to: determine that calibration, in the currently selected beam direction, of each reception channel of the array antenna to be calibrated is completed when the difference between the beam gain and the standard beam gain falls within the first preset range, transmit the second calibration signal at the specified power rating to the testing antenna oriented in the currently selected beam direction by using the array antenna to be calibrated, determine a signal power of the second calibration signal received by the testing antenna and transmitted by the array antenna to be calibrated, and determine if a difference between the signal power and the standard signal power is out of a second preset range; and when the difference between the signal power and the standard signal power is determined to be out of the second preset range, re-calibrate each reception channel of the array antenna to be calibrated in the currently selected beam direction; when the difference between the signal power and the standard signal power is determined to be fall within the second preset range, determine that calibration, in the currently selected beam direction, of each transmission channel of the array antenna to be calibrated is completed.

In one embodiment, the device further includes a first determining unit 45. Before the directional angle of the currently selected beam direction when the difference between the beam gain and the standard beam gain is determined to be out of the first preset range, the first determining unit 45 is configured to: determine if a number of calibration, in the currently selected beam direction, of each reception channel of the array antenna to be calibrated is greater than a preset number; and after determining if the number of calibration, in the currently selected the beam direction, of each reception channel of the array antenna to be calibrated is greater than the preset number, the first determining unit 45 is configured to: adjust the directional angle of the currently selected beam direction when the number of calibration is determined to be smaller than or equal to the preset number; or, transmit a warning signal for reception channel calibration when the number of calibration is determined to be greater than the preset number.

In one embodiment, the device further includes a second determining unit 46. Before each reception channel of the array antenna to be calibrated is re-calibrated in the currently selected beam direction, when the difference between the signal power and the standard signal power is determined to be out of the second preset range, the second determining unit 46 is configured to: determine if a number of calibration, in the currently selected beam direction, of each transmission channel of the array antenna to be calibrated is greater than a preset number; and after determining if the number of calibration, in the currently selected beam direction, of each transmission channel of the array antenna to be calibrated is greater than the preset number, the second determining unit 46 is configured to: when the number of calibration is determined to be smaller than or equal to the preset number, re-calibrate, in the currently selected beam direction, each reception channel of the array antenna to be calibrated; or, when the number of calibration is determined to be greater than the preset number, transmit a warning signal for transmission channel calibration.

In summary, according to the embodiments of the disclosure, the initial beam weight vector matrix of the array antenna to be calibrated is determined according to the preset direction angles of various beam directions. The differences in amplitude and phase of the first calibration signal received through the central channel and the first calibration signal received by each channel are determined according to the first calibration signal transmitted to the array antenna to be calibrated by using the testing antenna oriented in the standard beam direction and the first calibration signal received by each channel of the array antenna to be calibrated. The compensation beam weight vector matrix is obtained by calibrating the initial beam weight vector matrix according to the differences in amplitude and phase. Then the second calibration signal is transmitted to the array antenna to be calibrated at the specified power rating by using the testing antenna oriented in the standard beam direction. The standard beam gain of the second calibration signal transmitted by the testing antenna oriented in the standard beam direction and received by the array antenna to be calibrated via each channel is determined according to the compensation beam weight vector matrix. The second calibration signal is transmitted at the specified power rating to the testing antenna oriented in the standard beam direction by using the array antenna to be calibrated. The standard signal power of the second calibration signal transmitted by the array antenna to be calibrated and received by the testing antenna oriented in the standard beam direction is determined. For each testing antenna oriented in a beam direction different from the standard beam direction, the following operations are performed: each channel of the array antenna to be calibrated is calibrated in the currently selected beam direction by using the testing antenna oriented in the currently selected beam direction according to the standard beam gain and standard signal power corresponding to the testing antenna oriented in the standard beam direction.

The above-mentioned method for calibrating an array antenna based on OTA applies to an open calibration environment and does not require an anechoic chamber, which lowers the requirements for calibration environment and also detects the beamforming of the array antenna effectively simultaneously. By transmitting calibration signals to the array antenna via testing antennas oriented in different beam directions and by receiving calibration signals from the array antenna via the testing antennas oriented in different beam directions, differences in amplitude and phase, with respect to different beam directions, of each channel of the array antenna are determined; and differences in amplitude and phase are compensated for to calibrate the channels, so as to ensure the integrity of the beamforming ability of the array antenna quickly when the array antenna is being detected in practical production stage.

Those skilled in the art shall appreciate that the embodiments of the disclosure can be embodied as a method, a system or a computer program product. Therefore, the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the apparatus (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing apparatus to produce a machine so that the instructions executed on the computer or the processor of the other programmable data processing apparatus create means for performing the functions specified in the flow(s) of the flow chart and/or the block(s) of the block diagram.

These computer program instructions can also be stored into a computer readable memory capable of directing the computer or the other programmable data processing apparatus to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing apparatus so that a series of operational operations are performed on the computer or the other programmable data processing apparatus to create a computer implemented process so that the instructions executed on the computer or the other programmable apparatus provide operations for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for calibrating an array antenna, comprising:
    transmitting a first calibration signal to an array antenna to be calibrated by using a testing antenna oriented in a standard beam direction, and determining differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; wherein the central channel is a channel corresponding to a central element of the array antenna to be calibrated; and
    calibrating an initial beam weight vector matrix according to the differences in both the amplitude and the phase to obtain a compensation beam weight vector matrix, wherein the initial beam weight vector matrix is determined according to a preset directional angle of each beam direction and each group of initial beam weight vectors corresponds to one of beam directions.

2. The method according to claim 1, wherein calibrating the initial beam weight vector matrix according to the differences in both the amplitude and the phase to obtain the compensation beam weight vector matrix comprises:
    compensating for each group of initial beam weight vectors in the initial beam weight vector matrix, respectively, according to the differences in both the amplitude and the phase to obtain the compensation beam weight vector matrix.

3. The method according to claim 1, after calibrating the initial beam weight vector matrix according to the differences in both the amplitude and the phase to obtain the compensation beam weight vector matrix, further comprising:
    transmitting a second calibration signal at a specified power rating to the array antenna to be calibrated by using the testing antenna oriented in the standard beam direction, and determining a standard beam gain of the second calibration signal transmitted by the testing antenna oriented in the standard beam direction and received by the array antenna to be calibrated via each channel according to the compensation beam weight vector matrix;

transmitting the second calibration signal at the specified power rating to the testing antenna oriented in the standard beam direction by using the array antenna to be calibrated, and determining a standard signal power of the second calibration signal transmitted by the array antenna to be calibrated and received by the testing antenna oriented in the standard beam direction; and for each testing antenna oriented in a beam direction different from the standard beam direction, calibrating each channel of the array antenna to be calibrated in a currently selected beam direction by using a currently selected testing antenna according to the standard beam gain and the standard signal power corresponding to the testing antenna oriented in the standard beam direction.

4. The method according to claim 3, wherein determining the standard beam gain of the second calibration signal transmitted by the testing antenna oriented in the standard beam direction and received by the array antenna to be calibrated via each channel according to the compensation beam weight vector matrix comprises:

determining a compensation beam weight vector corresponding to the testing antenna oriented in the standard beam direction according to the compensation beam weight vector matrix; and determining the standard beam gain of the second calibration signal transmitted by the testing antenna oriented in the standard beam direction and received by each channel of the array antenna to be calibrated according to the compensation beam weight vector.

5. The method according to claim 4, wherein each channel of the array antenna to be calibrated comprises a reception channel and a transmission channel; and after calibrating the initial beam weight vector matrix according to the differences in both the amplitude and the phase to obtain the compensation beam weight vector matrix, the method further comprises:

updating the initial beam weight vector matrix of each channel of the array antenna to be calibrated according to the compensation beam weight vector matrix, wherein each updated reception channel of the array antenna to be calibrated corresponds to a compensation reception beam weight vector matrix, each updated transmission channel corresponds to a compensation transmission beam weight vector matrix, and the compensation reception beam weight vector matrix and the compensation transmission beam weight vector matrix are the compensation beam weight vector matrix, respectively.

6. The method according to claim 5, wherein calibrating each channel of the array antenna to be calibrated in a currently selected beam direction by using a currently selected testing antenna according to the standard beam gain and the standard signal power corresponding to the testing antenna oriented in the standard beam direction comprises:

transmitting a second calibration signal at a specified power rating to the array antenna to be calibrated by using the testing antenna oriented in the currently selected beam direction, and determining a beam gain of the second calibration signal transmitted by the testing antenna and received by the array antenna to be calibrated according to the compensation beam weight vector corresponding to the testing antenna;

determining if the difference between the beam gain and the standard beam gain is out of a first preset range; and when the difference between the beam gain and the standard beam gain is determined to be out of the first preset range, adjusting a directional angle of the currently selected beam direction updating the compensation reception beam weight vector corresponding to an originally selected beam direction according to an adjusted beam direction, and re-calculating the beam gain of the second calibration signal according to an updated compensation reception beam weight vector until the difference between the beam gain and the standard beam gain falls within the first preset range.

7. The method according to claim 6, further comprising:

determining that calibration, in the currently selected beam direction, of each reception channel of the array antenna to be calibrated is completed when the difference between the beam gain and the standard beam gain falls within the first preset range, transmitting the second calibration signal at the specified power rating to the testing antenna oriented in the currently selected beam direction by using the array antenna to be calibrated, determining a signal power of the second calibration signal received by the testing antenna and transmitted by the array antenna to be calibrated, and determining if a difference between the signal power and the standard signal power is out of a second preset range; and when the difference between the signal power and the standard signal power is determined to be out of the second preset range, re-calibrating each reception channel of the array antenna to be calibrated in the currently selected beam direction; or when the difference between the signal power and the standard signal power is determined to be fall within the second preset range, determining that calibration, in the currently selected beam direction, of each transmission channel of the array antenna to be calibrated is completed.

8. The method according to claim 7, before re-calibrating each reception channel of the array antenna to be calibrated in the currently selected beam direction, when the difference between the signal power and the standard signal power is determined to be out of the second preset range, further comprising:

determining if a number of calibration, in the currently selected beam direction, of each transmission channel of the array antenna to be calibrated is greater than a preset number; and when the number of calibration is determined to be smaller than or equal to the preset number, re-calibrating, in the currently selected beam direction, each reception channel of the array antenna to be calibrated; or when the number of calibration is determined to be greater than the preset number, transmitting a warning signal for transmission channel calibration.

9. The method according to claim 6, before adjusting the directional angle of the currently selected beam direction when the difference between the beam gain and the standard beam gain is determined to be out of the first preset range, further comprising:

determining if a number of calibration, in the currently selected beam direction, of each reception channel of the array antenna to be calibrated is greater than a preset number; and adjusting the directional angle of the currently selected beam direction when the number of calibration is determined to be smaller than or equal to the preset number; or transmitting a warning signal for reception channel calibration when the number of calibration is determined to be greater than the preset number.

10. An electronic device, comprising one or more processors, and
one or more computer-readable mediums storing a program for calibrating an array antenna, wherein the one or more processors are configured to execute the program to perform the method according to claim 1.

11. One or more non-transitory computer-readable mediums, wherein the one or more computer-readable mediums store a program for calibrating an array antenna, and when one or more processors execute the program, a communication device performs the method according to claim 1.

12. A device for calibrating an array antenna, comprising:
a first processing unit, configured to transmit a first calibration signal to an array antenna to be calibrated by using a testing antenna oriented in a standard beam direction, and determine differences in both amplitude and phase between a first calibration signal received by a central channel of the array antenna to be calibrated and a first calibration signal received by each channel of the array antenna to be calibrated, according to the first calibration signal transmitted by the testing antenna oriented in the standard beam direction and received by the array antenna to be calibrated via each channel; wherein the central channel is a channel corresponding to a central element of the array antenna to be calibrated; and
a calibration unit, configured to calibrate an initial beam weight vector matrix according to the differences in both the amplitude and the phase to obtain a compensation beam weight vector matrix, wherein the initial beam weight vector matrix is determined according to a preset directional angle of each beam direction and each group of initial beam weight vectors corresponds to one of beam directions.

* * * * *